US008561330B2

(12) United States Patent
(10) Patent No.: US 8,561,330 B2
(45) Date of Patent: Oct. 22, 2013

Siegenthaler et al.

(54) MOUNTING SPRING, SYSTEM AND METHOD FOR MOUNTING A SIGN

(75) Inventors: John L. Siegenthaler, Mansfield, OH (US); Kevin Provagna, Medina, OH (US)

(73) Assignees: Lind Media Company, Mansfield, OH (US); Supro Spring & Wire Forms, Inc., Medina, OH (US)

( * ) Notice: Subject to any disclaimer, the term of this patent is extended or adjusted under 35 U.S.C. 154(b) by 99 days.

(21) Appl. No.: 13/039,546

(22) Filed: Mar. 3, 2011

(65) Prior Publication Data

US 2011/0214322 A1 Sep. 8, 2011

Related U.S. Application Data

(60) Provisional application No. 61/309,940, filed on Mar. 3, 2010.

(51) Int. Cl.
*G09F 17/00* (2006.01)
*F16F 1/12* (2006.01)

(52) U.S. Cl.
USPC .............................. 40/604; 160/378; 267/179

(58) Field of Classification Search
USPC .................... 40/603, 604; 160/329, 378, 369; 267/73, 74, 167, 177, 179, 180, 182; 38/102.4–102.5, 102.8
See application file for complete search history.

(56) References Cited

U.S. PATENT DOCUMENTS

| | | | | | |
|---|---|---|---|---|---|
| 1,392,757 | A | * | 10/1921 | Gales | 180/68.5 |
| 1,548,905 | A | * | 8/1925 | Schon | 267/288 |
| 1,597,549 | A | * | 8/1926 | Siegel | 152/218 |
| 2,379,499 | A | * | 7/1945 | Smith | 160/378 |
| 2,456,302 | A | * | 12/1948 | Mocnik | 248/468 |
| 2,544,352 | A | * | 3/1951 | Phelps et al. | 73/531 |
| 2,893,147 | A | * | 7/1959 | Mollet, III | 40/604 |
| 3,718,325 | A | * | 2/1973 | Nystrom | 267/74 |
| 4,162,063 | A | * | 7/1979 | Nissen et al. | 482/27 |
| 7,168,197 | B2 | | 1/2007 | Siegenthaler | |

* cited by examiner

*Primary Examiner* — Casandra Davis
(74) *Attorney, Agent, or Firm* — Rankin, Hill & Clark LLP

(57) ABSTRACT

A mounting system and method for tautly mounting a flexible material sign includes a plurality of mounting springs affixed to an associated sign structure. Each of the plurality of mounting springs includes a base portion, a grasping portion and a spring portion. The base portion is adapted to be secured to an associated sign structure, such as a structure to which the flexible material sign is to be mounted, a frame or similar structure surrounding the flexible material sign, etc. The grasping portion includes a finger adapted to be received within an aperture of the flexible material sign. The spring portion is disposed between the base portion and the grasping portion for applying a tension to the flexible material sign.

16 Claims, 10 Drawing Sheets

MOUNTING SPRING, SYSTEM AND METHOD FOR MOUNTING A SIGN

This application claims the benefit of U.S. Provisional Patent Application Ser. No. 61/309,940 filed Mar. 3, 2010, which is expressly incorporated herein by reference.

BACKGROUND

The present disclosure generally relates to signs and banners, and more particularly relates to a mounting spring, system and method for tautly mounting a sign or banner such as a flexible material sign or banner to an associated sign structure.

Flexible material signs or displays, such as those constructed of vinyl, are increasingly being used in the marketplace. These types of signs are generally lightweight and relatively inexpensive to manufacture. A variety of methods are known for mounting these types of signs to associated sign structures (e.g., billboard structures, building walls, truck trailers, other sign structures, etc.). One known system and method for tautly mounting a sign is taught in U.S. Pat. No. 7,168,197, expressly incorporated herein by reference.

SUMMARY

In accordance with one aspect, a mounting spring for tautly mounting a flexible material sign includes a base portion adapted to be secured to an associated sign structure, a grasping portion, and a spring portion. The grasping portion includes a finger adapted to be received within an aperture of the flexible material sign. The spring portion is disposed between the base portion and the grasping portion for applying a tension to the flexible material sign.

In accordance with another aspect, a mounting system for tautly mounting a flexible material sign includes a plurality of mounting springs affixed to an associated sign structure. Each of the plurality of mounting springs includes a base portion, a grasping portion and a spring portion. The base portion is adapted to be secured to the associated sign structure. The grasping portion includes a finger adapted to be received within an aperture of the flexible material sign. The spring portion is disposed between the base portion and the grasping portion for applying a tension to the flexible material sign.

In accordance with still another aspect, a method for tautly mounting a flexible material sign is provided. In the method according to this aspect, a plurality of mounting springs are secured to an associated sign structure. Each of the plurality of mounting springs includes a base portion, a grasping portion and a spring portion. The base portion is adapted to be secured to the associated sign structure. The grasping portion includes a finger adapted to be received within an aperture of the flexible material sign. The spring portion is disposed between the base portion and the grasping portion for applying tension to the flexible material sign. For each of the plurality of mounting springs, a tension force is applied on the grasping portion relative to the base portion to longitudinally move the grasping portion relative to the base portion by stretching the spring portion. The finger of each of the plurality of mounting springs is passed through a corresponding aperture defined in the flexible material sign with the tension force applied. The applied tension force is then released to allow the grasping portion to tautly pull on the flexible material sign.

DETAILED DESCRIPTION

Figure 1:
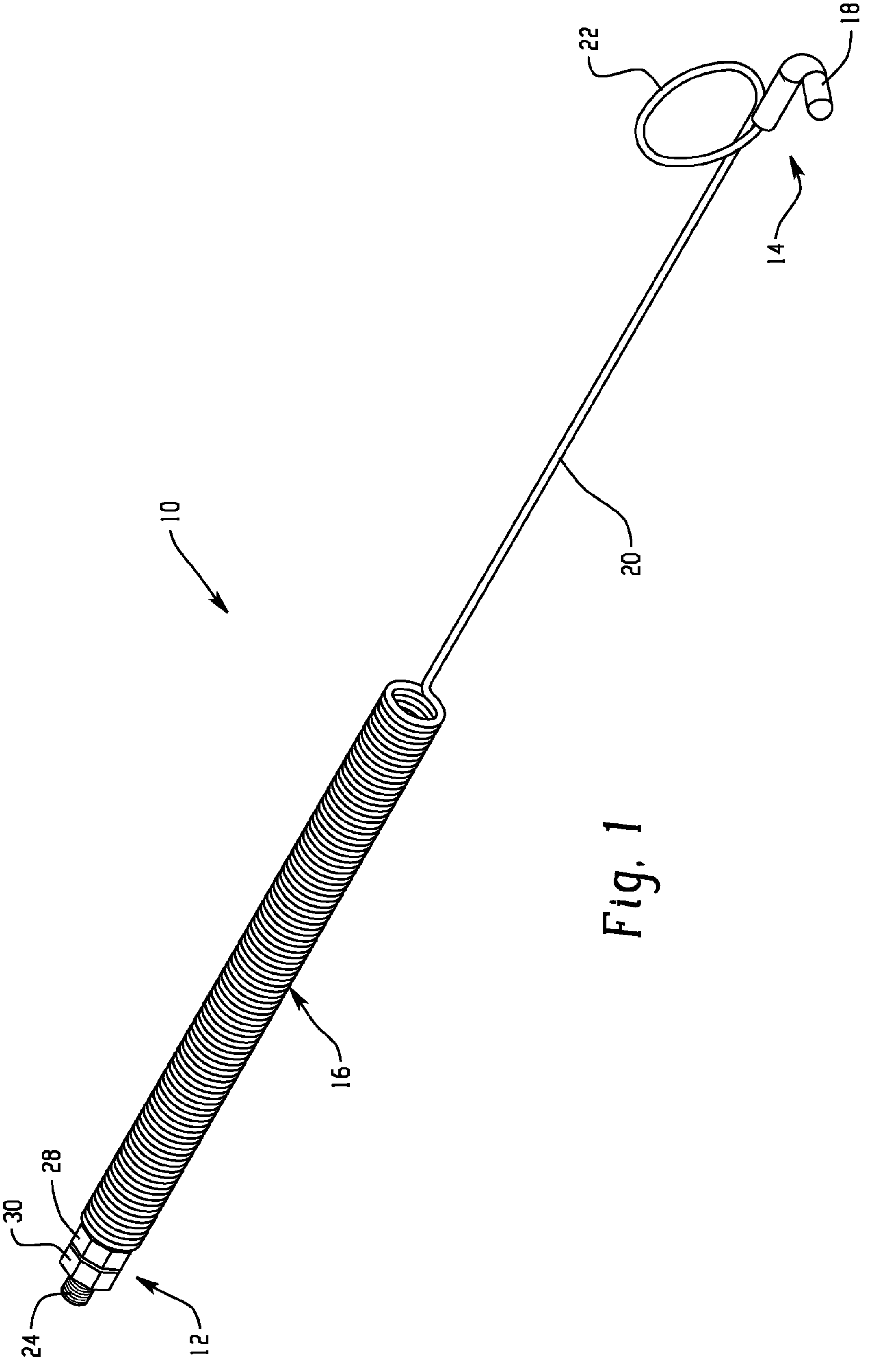
FIG. 1 is a perspective view of a mounting spring for tautly mounting a flexible material sign.
Figure 2:
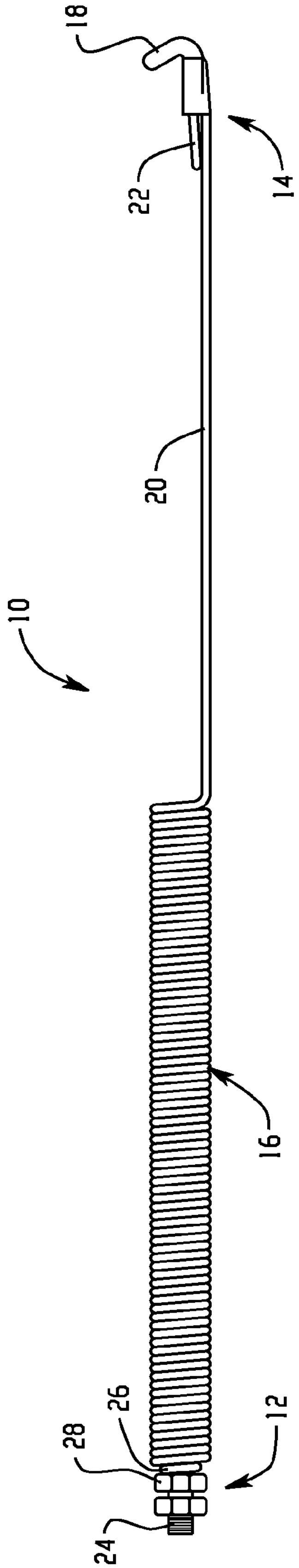
FIG. 2 is a plan view of the mounting spring of FIG. 1.
Figure 3:
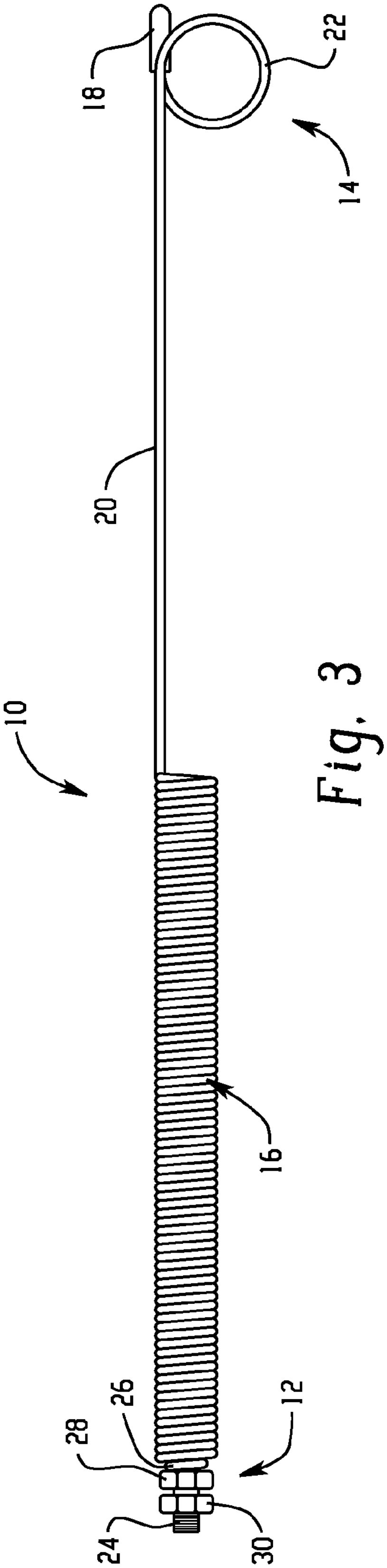
FIG. 3 is a side view of the mounting spring of FIG. 1.
Figure 4:
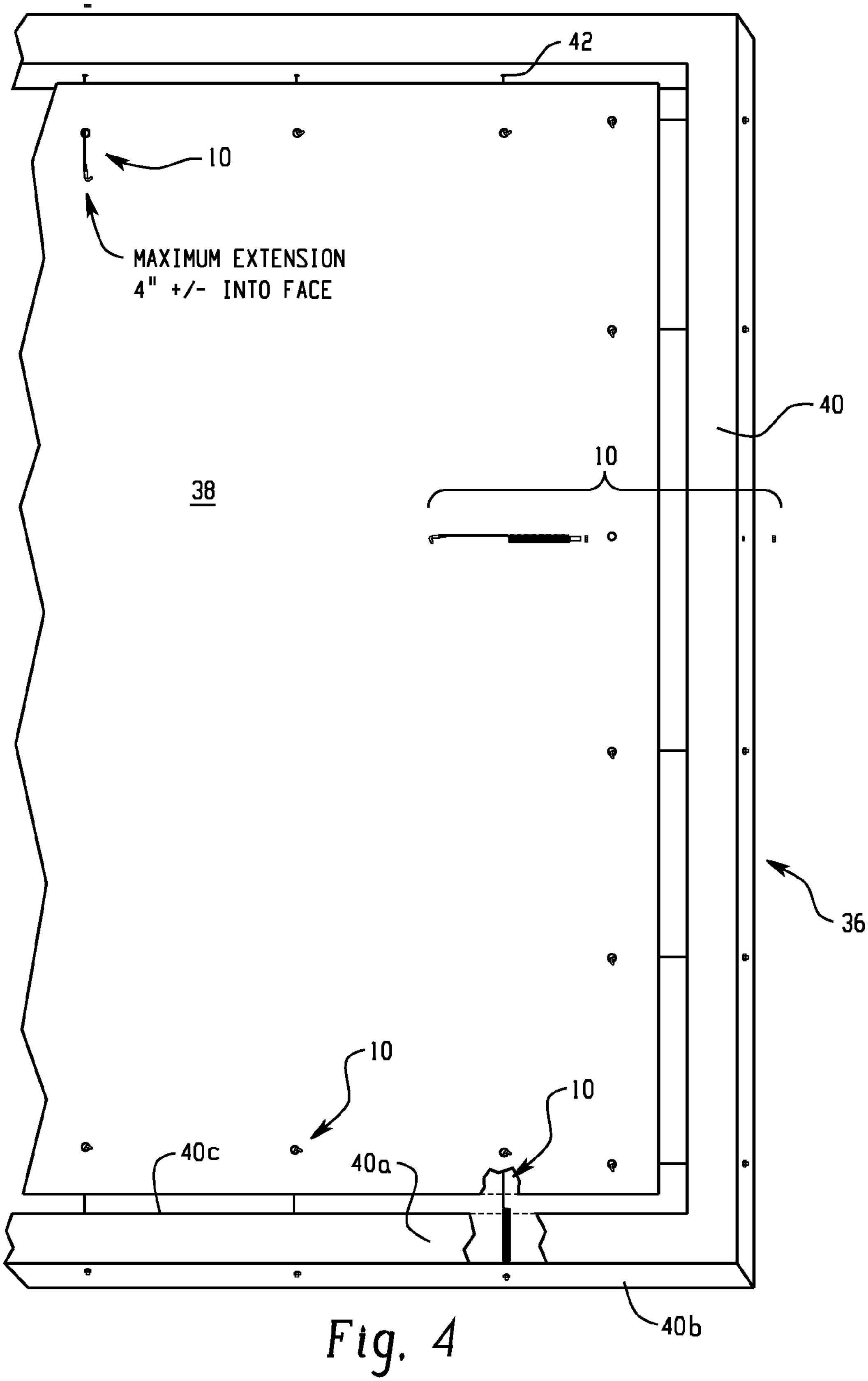
FIG. 4 is a partial schematic perspective view of a mounting system including a plurality of the mounting springs shown in FIGS. 1-3 for tautly mounting a flexible material sign.

Referring now to the drawings, wherein the showings are for purposes of illustrating one or more exemplary embodiments and not for purposes of limiting same, FIGS. 1-3 show a mounting spring 10 for tautly mounting a flexible material sign or banner (e.g., sign 38 of FIG. 4). The sign can be of any known construction, such as from polyethylene, vinyl, etc. The illustrated mounting spring 10 includes a base portion 12, a grasping portion 14 and a spring portion 16. The base portion 12 is adapted to be secured to an associated sign structure (e.g., sign structure 40 at FIG. 4). The sign structure can be any structure to which a flexible material sign is to be mounted by the mounting spring 10. For example, the sign structure could be a billboard structure, the side of a building, the side of a truck trailer, etc. In general, the sign structure could be any surface, such as those provided by walls, doors, etc. The sign structure could also be an open frame or similar structure surrounding the flexible material sign or some other intermediate component between the flexible material sign and the associated sign structure. Still further, the sign structure could simply be one or more mounting points for one or more of the spring 10 that allow a sign to be hung, including in an open air space (i.e., with no structure immediately behind the sign).

The grasping portion 14 of the illustrated mounting spring 10 includes a hooked portion or finger 18 (also referred to as a hook tip) that is adapted to be received within a corresponding aperture of the flexible material sign. The spring portion 16 is disposed between the base portion 12 and the grasping portion 14 for allowing relative movement between the base potion 12 and the grasping portion and for applying a tension to the flexible material sign. In the illustrated embodiment, the finger 18 includes an over-mold or sleeve, which can be formed of plastic or some other relative softer material (e.g., rubber, etc.), so as to reduce the likelihood of the finger 18 tearing the flexible material sign when tautly mounting the sign.

The mounting spring 10 of the illustrated embodiment further includes an elongated extension portion 20 positioned or disposed between the spring portion 16 and the grasping portion 14. The extension portion 20 can be used in applications where the apertures of the flexible material sign are positioned more inwardly relative to a peripheral edge of the flexible material sign and/or where the mounting spring 10 extends through or along a relatively wide frame or molding structure surrounding the flexible material sign. While the illustrated embodiment is shown with the extension portion 20, it is to be appreciated and understood by those skilled in the art that the elongated portion 20 could be removed, shortened or lengthened to any desired length (e.g. as shown in the alternate embodiments of FIGS. 7, 8 and 10).

The grasping portion 14 of the illustrated embodiment includes a looped portion 22 that can be used to apply a tension force on the grasping portion 14 relative to the base portion 12 to stretch the spring portion 16. In particular, the looped portion 22 can allow an installer to more easily pull on the mounting spring 10 when the base portion 12 is already secured to the associated sign structure to stretch the mounting spring 10 and insert the finger 18 of the grasping portion 14 in a corresponding aperture of the flexible material sign. Advantageously, using the looped portion 22 does not hinder or obstruct the finger 18 from being received in the aperture of the flexible material sign. While the illustrated embodiment is shown with the looped portion 22, it is to be appreciated and understood by those skilled in the art that the mounting spring 10 could be constructed without the looped portion and/or some other structure could be provided on the mounting spring 10 for the same purpose. For example, a hook (not shown) in addition to the finger 18 could be provisioned on the grasping portion 14. Alternatively, as will be described in more detail below, a tool can be used to apply the tension force by engaging the looped portion 22 or the finger 18, through this is not required.

The base portion 12, which is adapted to be secured to the associated sign structure, can include a threaded region or portion 24 for fastening to the associated sign structure. In the illustrated embodiment, the threaded portion 24 is the shaft of a screw. The head of the screw (not shown) is received within the spring portion 16. In particular, the threaded portion 24 is received through a distal-most coil 26 of the spring portion 16. The coil 26 can be appropriately sized for receipt around the threaded portion 24, but smaller than the head portion of the screw so as to limit axial pullout from the screw from the spring portion 16. A first threaded fastener, such as a nut 28, can secure the screw and the threaded portion 24 axially relative to the spring portion 16 (i.e., limit axial insertion into the spring portion 16). A second threaded fastener, such as another nut 30, can be threadedly provided on a threaded portion 24 for use in securing a mounting spring 10 to the associated sign structure.

With reference to FIG. 4, a mounting system 36 is shown for tautly mounting a flexible material sign 38 to an associated sign structure 40. As shown, the associated sign structure 40 can be a frame or similar structure (e.g., a molding) surrounding the flexible material sign 38. The frame 40 can then itself be mounted or secured to another associated sign structure. For example, the frame 40 can be secured to a billboard support structure, the side of a building, the side of a truck trailer, etc. While illustrated as a frame, it is to be appreciated by these skilled in the art that the sign structure 40 can be any structure to which the flexible material sign 38 is to be mounted, including the examples described hereinabove. The mounting system 36 includes a plurality of the mounting springs 10 affixed to the associated sign structure 40. In particular, each of the plurality of mounting springs 10 can have its base portion 12 secured to the associated sign structure 40 and its grasping portion 14, particularly the finger 18 thereof, received within a correspondence aperture 42 of the flexible material sign 38. The distance between the mounting location of the base portion 12 to the associated sign structure 40 and the aperture 42 in which the finger 18 is received can be such that a tension is applied to the spring portion 16 of each of the mounting springs 10 to thereby apply a tension on the flexible material sign 38 to tautly mount a sign 38.

Figure 9:
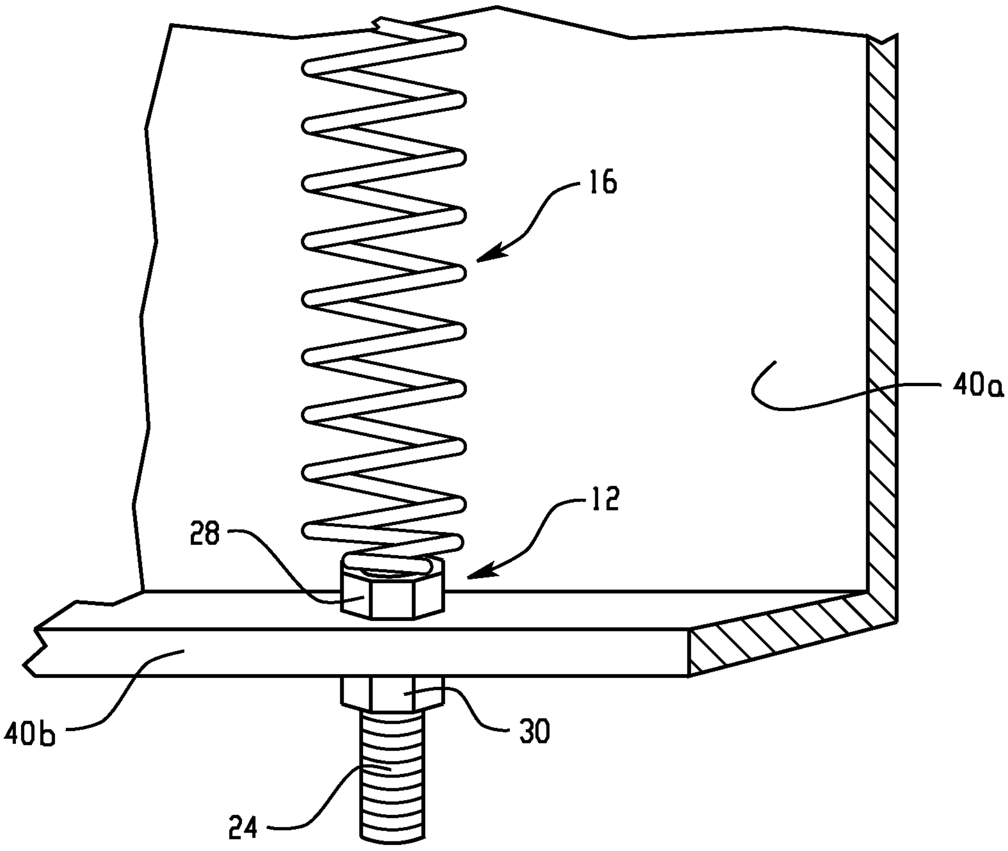
FIG. 9 is a partial perspective view of a mounting spring similar to that of FIGS. 1-3 shown with its base portion mounted to an associated sign structure.

In one embodiment, the frame 40 can be comprised of sections (i.e., two elongated horizontal sections, and two vertical sections) each formed of a front wall 40*a*, a peripheral edge wall 40*b* and an interior wall 40*c*. More particularly, with additional reference to FIG. 9, the base portion 12 of each mounting spring 10 can be secured to the peripheral edge wall 40*b*, the spring portion 16 can extend along and behind the facing wall 40*a*, and the elongated extension portion 20 can pass behind and along the interior wall 40*c* (not shown in FIG. 9). In an alternative construction, the frame sections could be constructed of solid members and the mounting springs 10 could be inserted through elongated holes extending through such solid frame sections. In still other embodiments, the sign structure can take on some other configuration suitable for having one or more of the mounting springs 10 affixed thereto for tautly mounting a flexibly material sign (e.g., an L-shaped bracket, etc.).

Figure 5:
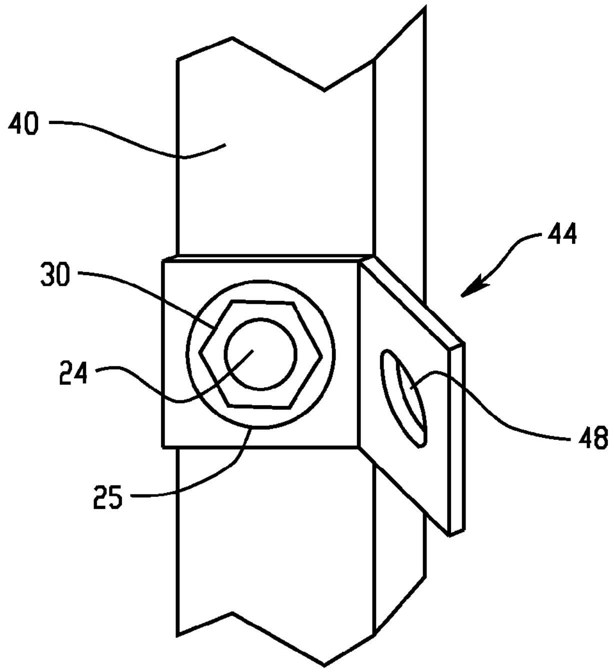
FIG. 5 is a partial elevational view of a frame structure to which one of the mounting springs is secured.
Figure 6:
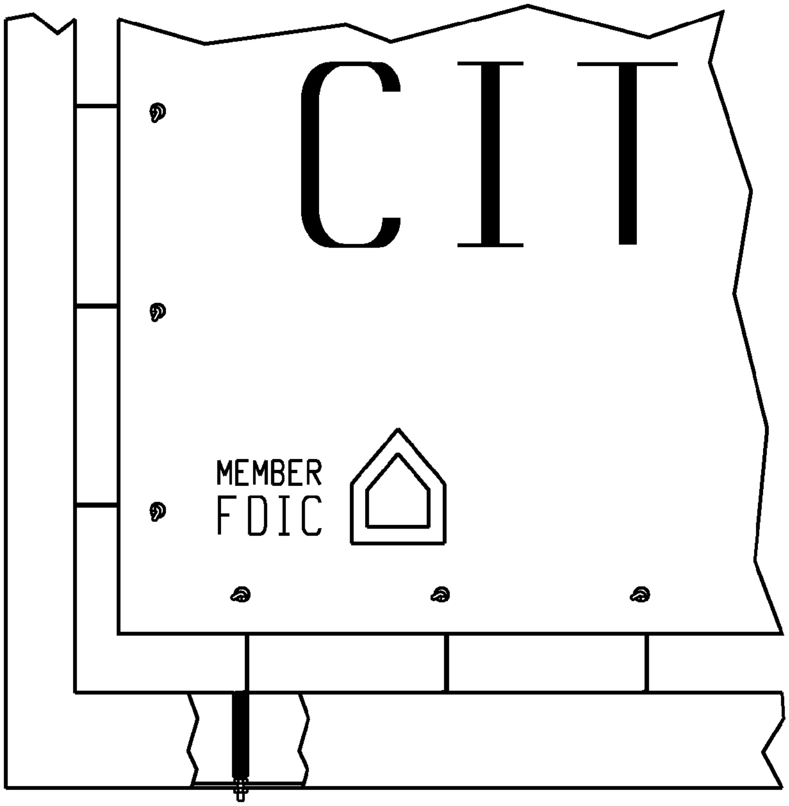
FIG. 6 illustrates the mounting spring securing a flexible material sign to an associated sign structure.

With reference to FIG. 5, angle mounts or brackets 44 can be provided for securing the frame 40 to an associated structure, such as a billboard structure, a truck, a wall, etc. Each bracket 44 can be L-shaped with an aperture 48 provided on each section of the bracket 44. One such aperture (not shown) can be for allowing the mounting spring 10 to pass therethrough and the other aperture 48 can be for allowing a fastener to secure the bracket 44 to an associated structure. The fastener for aperture 48 could be, for example, a self-tapping metal screw.

According to the foregoing, a method for tautly mounting a flexible material sign will now be described. In the method, a plurality of the mounting springs are secured to an associated sign structure, such as frame 40. Each of the plurality of mounting springs can be constructed according to one of the embodiments described herein (e.g., mounting spring 10). For each mounting spring 10, a tension force is applied on the grasping portion 14 relative to the base portion 12, which is secured to the frame 40, to longitudinally move the grasping portion 14 relative to the base portion 12 by stretching the spring portion 16. This applies a tension on the mounting spring 10 and allows the finger 18 of the grasping portion 14 to be received through the corresponding aperture 42 of the flexible material sign 38. In this manner, each finger 18 of the mounting spring 10 is passed through a corresponding aperture 42 defined in the flexible material sign 18 while the tension force is still applied.

As already described, the tension force can be applied using the looped portion 22 of the mounting spring 22 or can be applied directly to the finger 18. If desired, as will be further described below, a tool can be used to facilitate application of the tension force on the grasping portion 14. In any case, after the finger 18 is passed through the corresponding aperture 42 defined in flexible material sign 38, the applied tension force is released to allow the grasping portion 14 to tautly pull on the flexible material sign 38.

Figure 12:
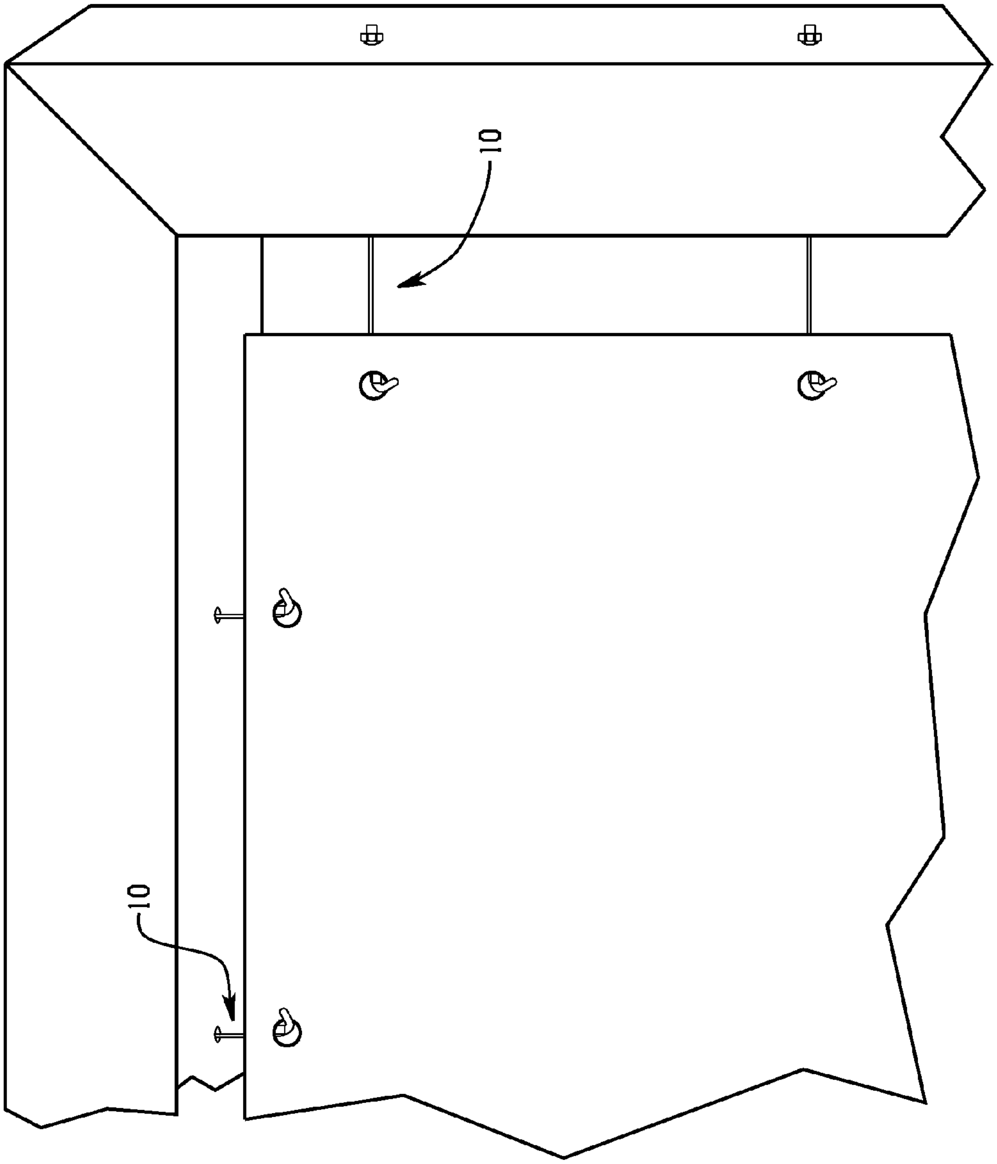
FIG. 12 is a partial perspective view of a flexible material sign mounted to an associated sign structure by a plurality of mounting springs.
Figure 13:
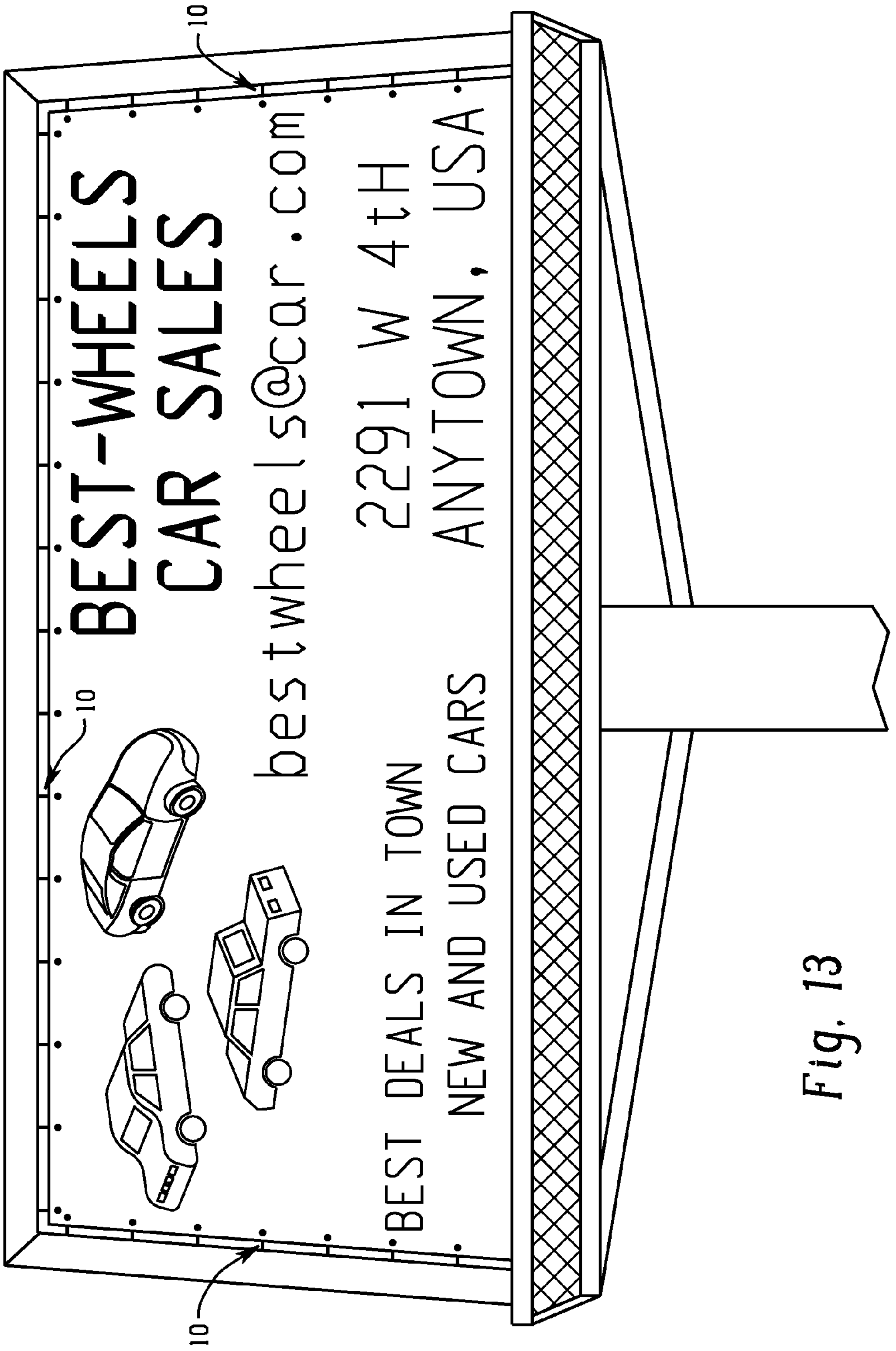
FIG. 13 is a front elevation view of a the flexible material sign and sign structure of FIG. 12.

Advantageously, the mounting spring, system and method described herein provide for easy and quick installation of flexible material signs without requiring the use of cables, clips, pulleys, gripper bars, etc. The mounting spring, system and method allow flexible material signs to be hung in an aesthetically pleasing manner. In particular, the mounting springs 10 function to eliminate or substantially reduce wrinkles in the flexible material sign. Also, as shown in FIGS. 12 and 13, each mounting spring 10 remains essentially hidden behind or in the molding or frame 40.

It should be appreciated that the mounting springs 10 can be manufactured in various sizes (e.g., 6 inch, 11 inch, 15 inch lengths, etc.). In addition, the relative size proportions of the grasping portion 20, the spring portion 16 and the extension portion 20, when included, can vary relative to one another. Still further, a plurality of mounting springs 10 used to mount a particular flexible material sign (e.g., sign 38) can be of varying sizes. In one embodiment, mounting springs having a first length (e.g., approximately 11 inches) are used to mount a flexible material sign, such as described in reference to FIG. 4, and additional mounting springs having a longer second length (e.g., approximately 15 inches) are used to mount corners of the flexible material sign. These longer length mounting springs could have a length sufficient to allow them to run diagonally from an outside corner of a sign structure (e.g., sing structure 40) to a corner of the flexible material sign.

Figure 7:
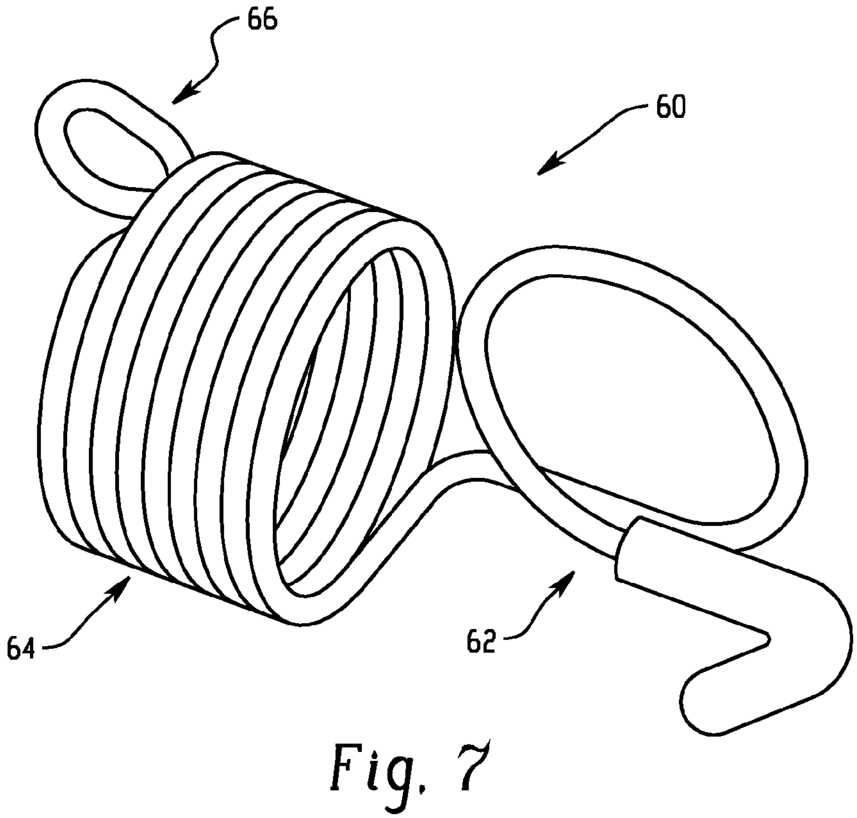
FIG. 7 is a perspective view of a mounting spring according to an alternate exemplary embodiment.
Figure 8:
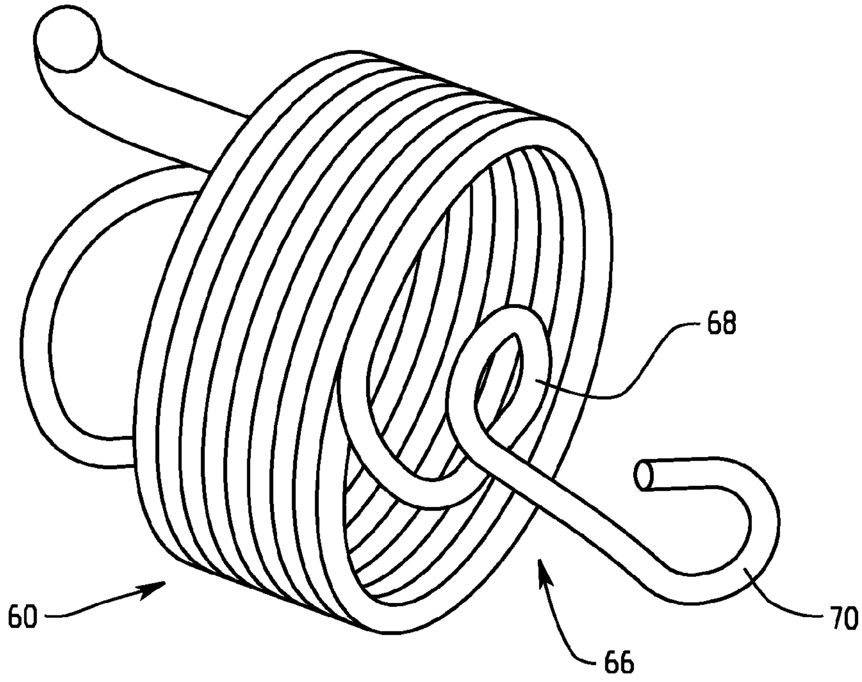
FIG. 8 is another perspective view of the mounting spring of FIG. 7 showing a base portion thereof.

With reference to FIGS. 7 and 8, a mounting spring 60 is shown according to an alternate exemplary embodiment. Except as described herein, the mounting spring 60 can be the same as the mounting spring 10 of FIGS. 1-3. One difference is that the mounting spring 60 does not include an elongated extension portion between its grasping portion 62 and its spring portion 64. This can enable the mounting spring 60 to be advantageously used in applications where no framing or molding, such as framing or molding 40, is employed. In addition, the spring portion 64 can be constructed to as to minimize the length thereof. For example, in the illustrated embodiment, the spring portion 64 is much shorter in length but is slightly enlarged in diameter so as to provide sufficient spring force. It is contemplated that the spring portion 64 could also be configured by using alternate materials to enable the spring to be even smaller for improving aesthetics.

Base portion 66 of the illustrated mounting spring 60 includes a first hooked or looped portion 68 adapted to be secured to an associated sign structure by a head and shaft type fastener (e.g., a screw, bolt, etc.). The hooked or looped portion 68 can be sized to receive the shaft portion of the fastener therethrough and seat against the head portion of the fastener. In the illustrated embodiment, portion 68 is formed as a looped portion and the base portion 66 additionally includes a second hooked or looped portion 70, which is also adapted to be secured to an associated sign structure by a head and shaft fastener (i.e., a screw, bolt, etc.). Like the portion 68, the hooked or looped portion 70 can be sized to receive the shaft portion of the fastener received therethrough and to seat against the head portion of the fastener.

Of particular advantage, the second portion 70 can be orthogonally oriented relative to the first portion 68. This provides alternative mounting arrangements for the mounting spring 60. More particularly, the mounting portion 68 can be used to mount against a surface orthogonally oriented relative to the flexible material sign to be mounted, whereas the portion 70 can be used to mount against a surface generally parallel to the flexible material sign to be mounted. Alternatively, the base portion 66 can be bent or flexed to orient one of the portions 68 or 70 to a desired position (e.g., one of the portions 68 or 70 could be bent backward to a forty-five degree angle).

Figure 10:
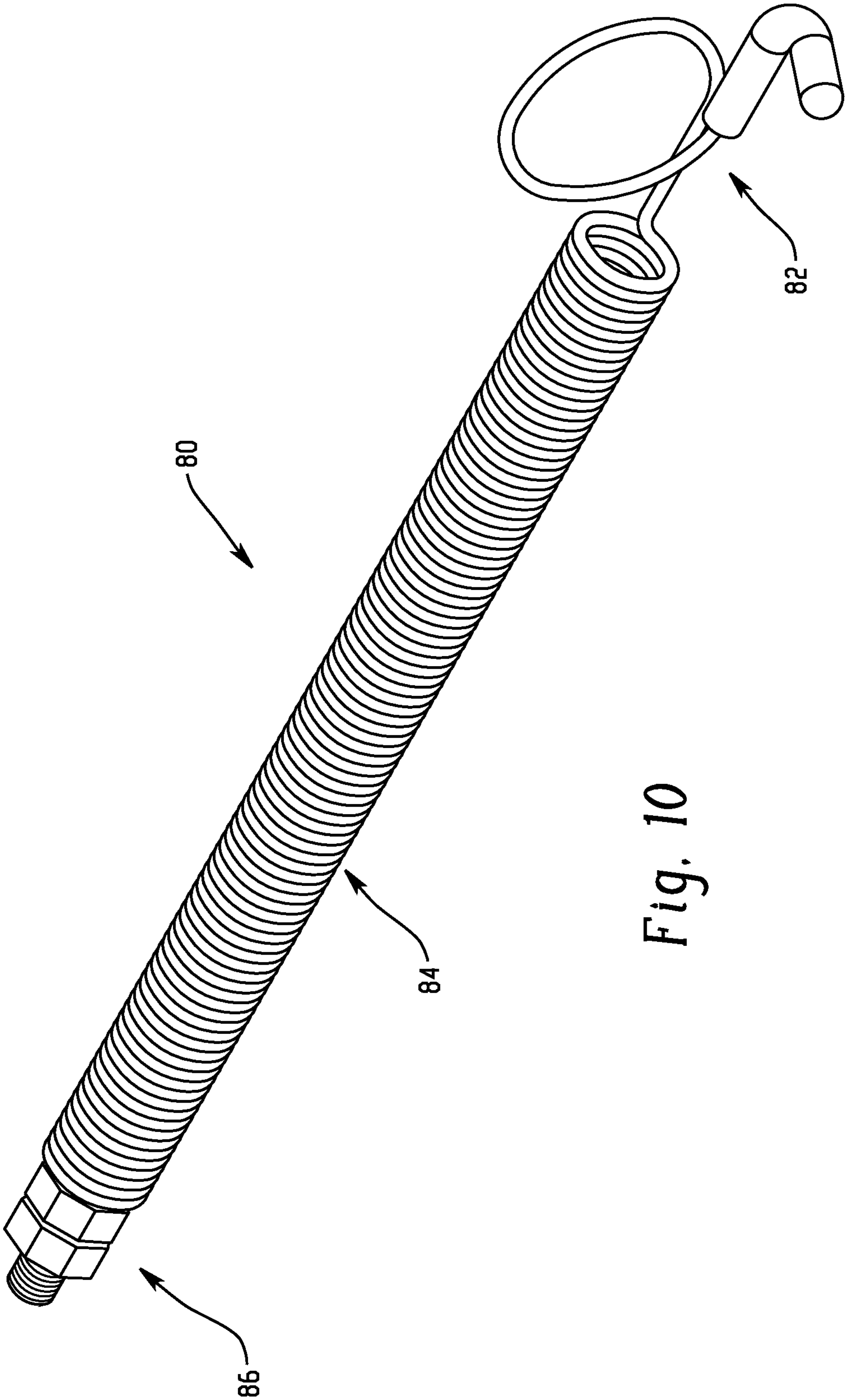
FIG. 10 is a perspective view of a mounting spring according to another alternate exemplary embodiment.

With reference to FIG. 10, a mounting spring 80 is shown according to another alternate exemplary embodiment. Except as described herein, the mounting spring 80 can also be the same as the mounting spring 10 of FIGS. 1-3. One difference is that the mounting spring 80 does not include an elongated extension portion between its grasping portion 82 and its spring portion 84. This can enable the mounting spring 60 to be advantageously used in applications where no framing or molding, such as framing or molding 40, is employed. Base portion 86 of the mounting spring 80 can be the same as base portion 12 of the mounting spring 10.

Figure 11:
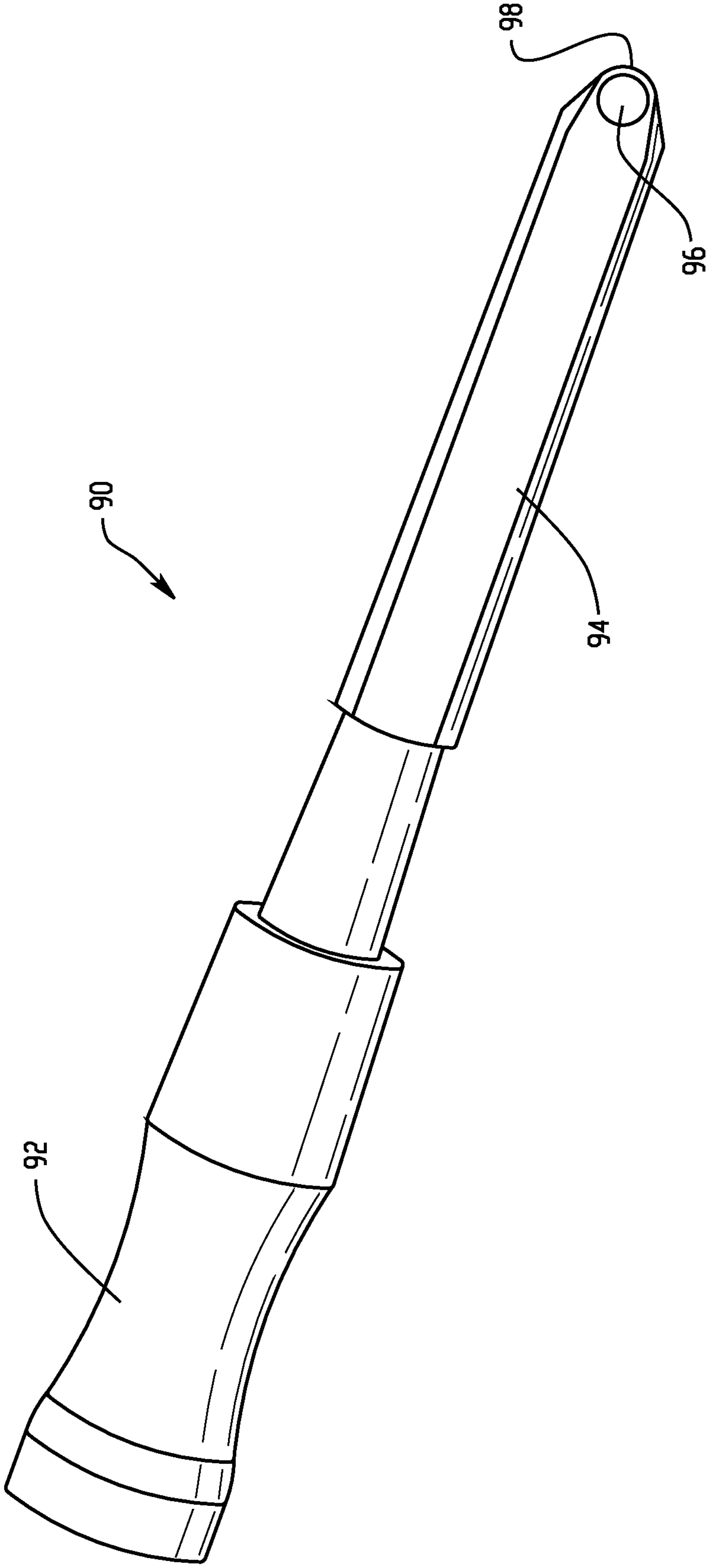
FIG. 11 is a perspective view of an installation tool that can be used for attaching a hooked end of a mounting spring, such as the one shown in FIG. 1, to a flexible material sign.

With reference to FIG. 11, an installation tool 90 is shown that can be used for installing any of the mounting springs disclosed herein. The illustrated installation tool 90 includes a handle 92 and a relatively flattened shaft portion 94 extending from the handle 92. An aperture 96 can be defined through the shaft portion 94 adjacent a distal end 98 thereof. Additionally, the distal end 98 can be formed as a tapered or sharpened tip that can function as a cutter, though this is not required. The distal end 98 can be tapered laterally about the aperture 98 to form an apex and is tapered from an upper to a lower surface to also form a cutting edge.

In use, the sharpened distal end 96 can be used to cut an aperture into a flexible material sign and/or to guide the tool 90 in an aperture of the flexible material sign, including in preformed or punched apertures or those newly cut by the tool 90. Once in a sign aperture, the tool 90 can be used to grab an end of a mounting spring, such as finger 18 of mounting spring 10, for example. Specifically, the finger 18 can be received through the aperture 96 of the tool 90. Once grabbed, the tool 90 can pull the finger 18 through the sign aperture while applying a tension force to the mounting spring 10 and then release the finger 18 after it is pulled into and through the sign aperture. Alternatively, the shaft portion 94 can be used to grab onto the looped portion 22 by receipt therein and then used to guide the finger 18 into the sign aperture.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A mounting spring tautly mounting a flexible material sign, comprising:

a base portion secured to an associated sign structure, said base portion including a threaded region for fastening to the associated sign structure;

a grasping portion including a finger received within an aperture of the flexible material sign; and a spring portion disposed between said base portion and said grasping portion to apply a tension to the flexible material sign, and wherein said grasping portion includes a looped portion for applying a tension force on said grasping portion relative to said base portion to longitudinally move said grasping portion relative to said base portion by stretching said spring portion.

2. The mounting spring of claim 1 further including an elongated extension portion between said spring portion and said grasping portion.

3. The mounting spring of claim 1 wherein said spring portion is a coiled spring portion.

4. The mounting spring of claim 1 wherein said base portion includes a first hooked or looped portion adapted to be secured to the associated sign structure by a head and shaft type fastener, said hooked or looped portion sized to receive the shaft portion of the fastener therethrough and seat against the head portion of the fastener.

5. The mounting spring of claim 4 wherein said base portion includes a second hooked or looped portion adapted to be secured to the associated sign structure by a head and shaft type fastener, said hooked or looped portion sized to receive the shaft portion of the fastener therethrough and seat against the head portion of the fastener, said second hooked or looped portion orthogonally oriented relative to said first hooked or looped portion.

6. A mounting spring for tautly mounting a flexible material sign, comprising:

a base portion adapted to be secured to an associated sign structure;

a grasping portion including a finger adapted to be received within an aperture of the flexible material sign; and a spring portion disposed between said base portion and said grasping portion for applying a tension to the flexible material sign, wherein said base portion includes a first hooked or looped portion adapted to be secured to the associated sign structure by a head and shaft type fastener, said hooked or looped portion sized to receive the shaft portion of the fastener therethrough and seat against the head portion of the fastener, and wherein said base portion includes a second hooked or looped portion adapted to be secured to the associated sign structure by a head and shaft type fastener, said hooked or looped portion sized to receive the shaft portion of the fastener therethrough and seat against the head portion of the fastener, said second hooked or looped portion orthogonally oriented relative to said first hooked or looped portion.

7. The mounting spring of claim 6 wherein said grasping portion includes a looped portion for applying a tension force on said grasping portion relative to said base portion to longitudinally move said grasping portion relative to said base portion by stretching said spring portion.

8. A method for tautly mounting a flexible material sign, comprising:

securing a plurality of mounting springs to an associated sign structure, each of said plurality of mounting springs including a base portion adapted to be secured to an associated sign structure, a grasping portion including a finger adapted to be received within an aperture of the flexible material sign, and a spring portion disposed between said base portion and said grasping portion for applying a tension to the flexible material sign, and wherein said base portion includes a threaded region for fastening to the associated sign structure, and wherein said grasping portion includes a looped portion for applying a tension force on said grasping portion relative to said base portion to longitudinally move said grasping portion relative to said base portion by stretching said spring portion;

for each of said plurality of mounting springs, applying a tension force on said grasping portion relative to said base portion to longitudinally move said grasping portion relative to said base portion by stretching said spring portion;

passing said finger of each of said plurality of mounting springs through a corresponding aperture defined in the flexible material sign with said tension force applied; and releasing said applied tension force to allow said grasping portion to tautly pull on the flexible material sign.

9. The method of claim 8 wherein each of the plurality of mounting springs further includes an elongated extension portion between said spring portion and said grasping portion.

10. The method of claim 8 wherein said base portion includes a first hooked or looped portion adapted to be secured to the associated sign structure by a head and shaft type fastener, said hooked or looped portion sized to receive the shaft portion of the fastener therethrough and seat against the head portion of the fastener.

11. The method of claim 10 wherein said base portion includes a second hooked or looped portion adapted to be secured to the associated sign structure by a head and shaft type fastener, said hooked or looped portion sized to receive the shaft portion of the fastener therethrough and seat against the head portion of the fastener, said second hooked or looped portion orthogonally oriented relative to said first hooked or looped portion.

12. A mounting system for tautly mounting a flexible material sign, comprising:

a plurality of mounting springs affixed to an associated sign structure, each of said plurality of mounting springs including:

a base portion secured to the associated sign structure, said base portion including a first hooked or looped portion adapted to be secured to the associated sign structure by a head and shaft type fastener, said first hooked or looped portion sized to receive the shaft portion of the fastener therethrough and seat against the head portion of the fastener;

a grasping portion including a finger received within an aperture of the flexible material sign and a looped portion for applying a tension force on said grasping portion relative to said base portion to longitudinally move said grasping portion relative to said based portion; and a spring portion disposed between said base portion and said grasping portion applying a tension to the flexible material sign.

13. The mounting system of claim 12 further including an elongated extension portion between said spring portion and said grasping portion.

14. The mounting system of claim 12 wherein said spring portion is a coiled spring portion.

15. The mounting system of claim 12 wherein said base portion includes a threaded region on said fastener for fastening to the associated sign structure, a nut for securing the base portion to the spring portion and a second nut for securing the threaded region to the associated sign structure.

16. The mounting system of claim 12 wherein said base portion includes a second hooked or looped portion adapted to be secured to the associated sign structure by a head and shaft type fastener, said hooked or looped portion sized to receive the shaft portion of the fastener therethrough and seat against the head portion of the fastener, said second hooked or looped portion orthogonally oriented relative to said first hooked or looped portion.

* * * * *